United States Patent
Shiba et al.

(10) Patent No.: US 9,264,456 B2
(45) Date of Patent: Feb. 16, 2016

(54) SIGNAL PROCESSING DEVICE, SIGNAL PROCESSING PROGRAM AND COMMUNICATION SYSTEM

(75) Inventors: Shugo Shiba, Chiba (JP); Masayuki Komiya, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 250 days.

(21) Appl. No.: 12/846,258

(22) Filed: Jul. 29, 2010

(65) Prior Publication Data
US 2011/0078314 A1    Mar. 31, 2011

(30) Foreign Application Priority Data

Sep. 29, 2009 (JP) ................................ 2009-225144

(51) Int. Cl.
*G06F 15/16* (2006.01)
*H04L 29/06* (2006.01)

(52) U.S. Cl.
CPC ........ *H04L 65/1053* (2013.01); *H04L 65/1006* (2013.01); *H04L 65/1033* (2013.01)

(58) Field of Classification Search
USPC ........................................................ 709/227
See application file for complete search history.

(56) References Cited

U.S. PATENT DOCUMENTS

| 7,734,752 | B2 * | 6/2010 | Zuk et al. ....................... 709/223 |
| 2004/0210944 | A1 * | 10/2004 | Brassil et al. ................. 725/135 |
| 2007/0183423 | A1 * | 8/2007 | Passarella et al. ............ 370/392 |
| 2008/0151915 | A1 | 6/2008 | Masuya et al. |
| 2008/0175229 | A1 * | 7/2008 | Lee ................................ 370/352 |
| 2009/0113066 | A1 * | 4/2009 | Van Wie et al. ............... 709/231 |

FOREIGN PATENT DOCUMENTS

| JP | 2007-116368 A | 5/2007 |
| JP | 2007-116430 A | 5/2007 |
| JP | 2008-178060 A | 7/2008 |

OTHER PUBLICATIONS

J. Rosenberg et al., IETF (The Internet Engineering Task Force) RFC3261 "SIP: Session Initiation Protocol", Jun. 2002, http://www.ietf.org/rfc/rfc3261.txt.
IETF (The Internet Engineering Task Force) RFC3550 "RTP: A Transport Protocol for Real-Time Applications", 2003, http://www.ietf.org/rfc/rfc3550.txt.

* cited by examiner

*Primary Examiner* — Ryan Jakovac
(74) *Attorney, Agent, or Firm* — Rabin & Berdo, P.C.

(57) ABSTRACT

There is provided a signal processing device including: a packet receiving means for receiving a packet from a transmitting communication device; and a packet processing means for transmitting the received packet received by the packet receiving means, simply as received or after processing by a packet converting means, to a receiving communication device that is a destination of the packet, wherein when a communication session between a first transmitting communication device and the receiving communication device is established and the session is shifted to have a connection between a second transmitting communication device and the receiving communication device, the packet converting means converts the received packet received from the second transmitting communication device so as to maintain a consecutiveness related to a content of packets to be transmitted to the receiving communication device.

9 Claims, 7 Drawing Sheets

SIGNAL PROCESSING DEVICE, SIGNAL PROCESSING PROGRAM AND COMMUNICATION SYSTEM

BACKGROUND OF THE INVENTION

1. Field of the Invention

The present invention relates to a signal processing device, a signal processing program and a communication system and is applicable to an IP phone communication system, for example.

2. Description of the Related Art

In general, to provide services such as a call transfer and a guidance connection in an IP phone communication system, for example, control signals of SIP (see Session Initiation Protocol; IETF RFC3261) or the like sent by an IP phone terminal are used to realize a session switching of user signals such as RTP/RTCP (see Real-time Transport Protocol/RTP Control Protocol; IETF RFC3550, etc.).

FIG. 6 is an example of a configuration that realizes an operation for switching a session of user signals by using an IP phone communication system of a related art.

An IP phone communication system 601 is a system that provides an IP phone service to IP phone terminals 602-1 to 602-3. The IP phone terminals 602-1 to 601-3 are terminals serving as user interfaces to provide the IP phone service.

An IP phone exchange server 603 is a control device for exchanging control signals with the IP phone terminals and controlling connections and provides service such as a connection between IP phone terminals and transfer to different IP phone terminals.

FIG. 7 is an explanatory diagram of an operation for switching a session of user signals (a call transfer) in the IP phone communication system 601 illustrated in FIG. 6.

In FIGS. 6 and 7, control signals are signals used for controlling, that are exchanged between the IP phone exchange server 603 and the respective IP phone terminals, and a signal format of the signals ma be a standardized format such as SIP (RFC 3261). A control signal 604-1 is a control signal sent between the IP phone exchange server 603 and the IP phone terminal 602-1 and a control signal 604-2 is a control signal transmitted between the IP phone exchange server 603 and the IP phone terminal 602-2. Note that a control signal is also transmitted between the IP phone exchange server 603 and the IP phone terminal 602-3 although the signal is not illustrated in FIG. 6.

In FIGS. 6 and 7, the user signals are signals (for example, voice, image signals, etc.) exchanged between the IP phone terminals and a signal format of the signals may be a standardized format such as RTP (RFC 3550). A user signal 605-1 is a signal exchanged between the IP phone terminal 602-1 and the IP phone terminal 602-2. A user signal 605-2 is a signal exchanged between the IP phone terminal 602-1 and the IP phone terminal 602-3. A user signal 605-3 is a signal exchanged between the IP phone terminal 602-2 and the IP phone terminal 602-3.

Next, an example in which a call is transferred from the IP phone terminal 602-1 to the IP phone terminal 602-3 while a call between the IP phone terminal 602-1 and IP phone terminal 602-2 is active will be explained.

In an initial condition, it is assumed that the call between the IP phone terminal 602-1 and IP phone terminal 602-2 is active. In this assumption, the user signal 605-1 is in connection and the user signal 605-2 and the user signal 605-3 are not in connection.

Next, the IP phone terminal 602-1 initiates a call to the IP phone terminal 602-3 and the call becomes active so that the user signal 605-2 is connected and the user signal 605-1 becomes on hold (the connection is maintained).

Finally, when the IP phone terminal 602-1 terminates the call, the user signal 605-1 and the user signal 605-2 are disconnected, the user signal 605-3 is activated to be in connection. Here, a call transfer is completed.

SUMMARY OF THE INVENTION

However, it is difficult for an IP phone terminal constituting a conventional IP phone communication system illustrated in FIGS. 6 and 7 to provide services, such as a call transfer, a guidance connection or the like, between a terminal (non-compatible terminal), which does not have a session switching function of control signal processing for user signals, connecting plural user signals or the like, and a terminal (compatible terminal) that has the session switching function.

In light of the foregoing, it is desirable to provide a novel and improved signal processing device, signal processing program and communication system that can realize a communication session switching processing between communication devices having different process specifications related to a communication session.

According to an aspect of the present invention, there is provided a signal processing device including: a packet receiving means for receiving a packet from a transmitting communication device; and a packet processing means for transmitting the received packet received by the packet receiving means, simply as received or after processing by a packet converting means, to a receiving communication device that is a destination of the packet, wherein when a communication session between a first transmitting communication device and the receiving communication device is established and the session is shifted to have a connection between a second transmitting communication device and the receiving communication device, the packet converting means converts the received packet received from the second transmitting communication device so as to maintain a consecutiveness related to a content of packets to be transmitted to the receiving communication device.

According to another aspect of the present invention, there is provided a signal processing program that operates a computer mounted in a signal processing device to function as: a packet receiving means for receiving a packet from a transmitting communication device; and a packet processing means for transmitting the received packet received by the packet receiving means, simply as received or after converting by a packet converting means, to a receiving communication device that is a destination of the packet, wherein when a communication session between a first transmitting communication device and the receiving communication device is established and the session is shifted to have a connection between a second transmitting communication device and the receiving communication device, the packet converting means converts the received packet received form the second transmitting communication device so as to maintain a consecutiveness related to a content of packets to be transmitted to the receiving communication device.

According to another aspect of the present invention, there is provided a communication system that includes plural communication devices and a signal processing device for processing a packet transmitted among the plural communication devices, wherein the signal processing device is configured according to the above first aspect of the present invention.

According to the present invention, communication session switching processing between communication devices having different process specifications related to a communication session can be realized.

DETAILED DESCRIPTION OF THE EMBODIMENT(S)

Figure 1:
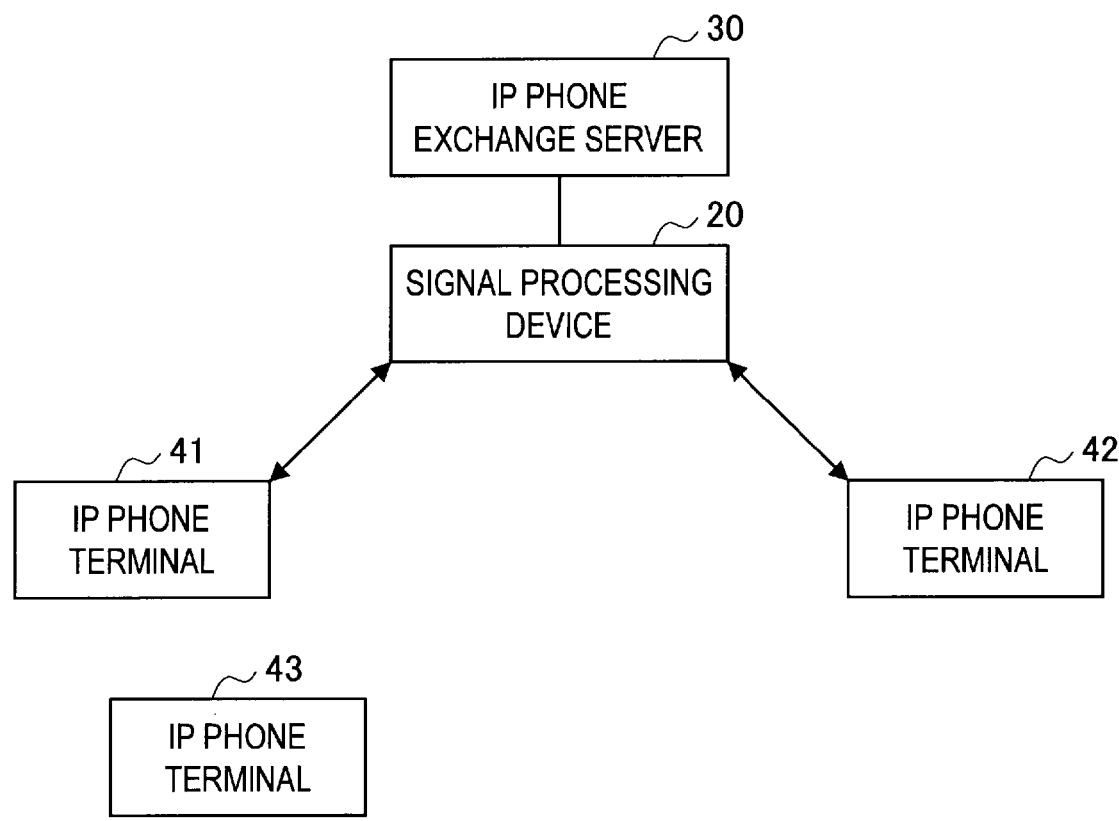
FIG. 1 is a block diagram illustrating an entire configuration of a communication system according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(A) First Embodiment

A signal processing device, a signal processing program, and a communication system according to a first embodiment of the present invention will be described with reference to the drawings.

(A-1) Configuration of First Embodiment

FIG. 1 is a block diagram illustrating an entire configuration of a communication system 10 of the embodiment.

In FIG. 1, the communication system 10 includes a signal processing device 20, an IP phone exchange server 30, and three IP phone terminals 41, 42, 43. Note that the number and the type of the IP phone terminals provided in the communication system 10 are not limited to that example.

The IP phone exchange server 30 has a function for controlling calls of the IP phone terminals 41 to 43.

In the communication system 10, the IP phone exchange server 30 executes a call control, by way of SIP, of communication between the IP phone terminals but the protocol to be used is not limited to SIP. Further, media traffic (voice, movie, and the like; the content is not limited) between the IP phone terminals is transmitted by way of RTP and RTCP in the following explanation; however the protocols to be used are not limited to RTP and RTCP.

The signal processing device 20 terminates a user signal transmitted from the IP phone terminals 41 to 43, converts the user signal to a content which is appropriate to be transmitted to a destination IP phone terminal of the user signal, and transmits the converted user signal to the destination IP phone terminal.

The signal processing device 20 may be applied as a device provided at a boundary of plural networks, for example. More specifically, when the respective IP phone terminals are in different networks and the respective networks have different communication specifications, the signal processing device 20 is used as a device for absorbing the difference of the communication specifications among the IP phone terminals.

In addition to communication means as hardware, the signal processing device 20 may include an information processing device having a CPU, a ROM, a RAM and the like to execute communication processing or data processing for example and may be provided with an installed program (including a signal processing program of the embodiment) to be executed by the information processing device.

Further, the signal processing device 20 relays call control signals transmitted between the IP phone exchange server 30 and the IP phone terminals 41 to 43, analyzes the content of the relayed call control signals, and processes the user signal according to the analysis result. The signal processing device 20 will be described in detail in the following explanation of operations.

Further in FIG. 1, the IP phone terminals 41, 42 are session switchable terminals that have a session switching function and the IP phone terminal 43 is a session non-switchable terminal that does not have a session switching function.

(A-2) Operation of First Embodiment

Next, an operation of the communication system 10 of the first embodiment having the above configuration will be described.

Figure 2:
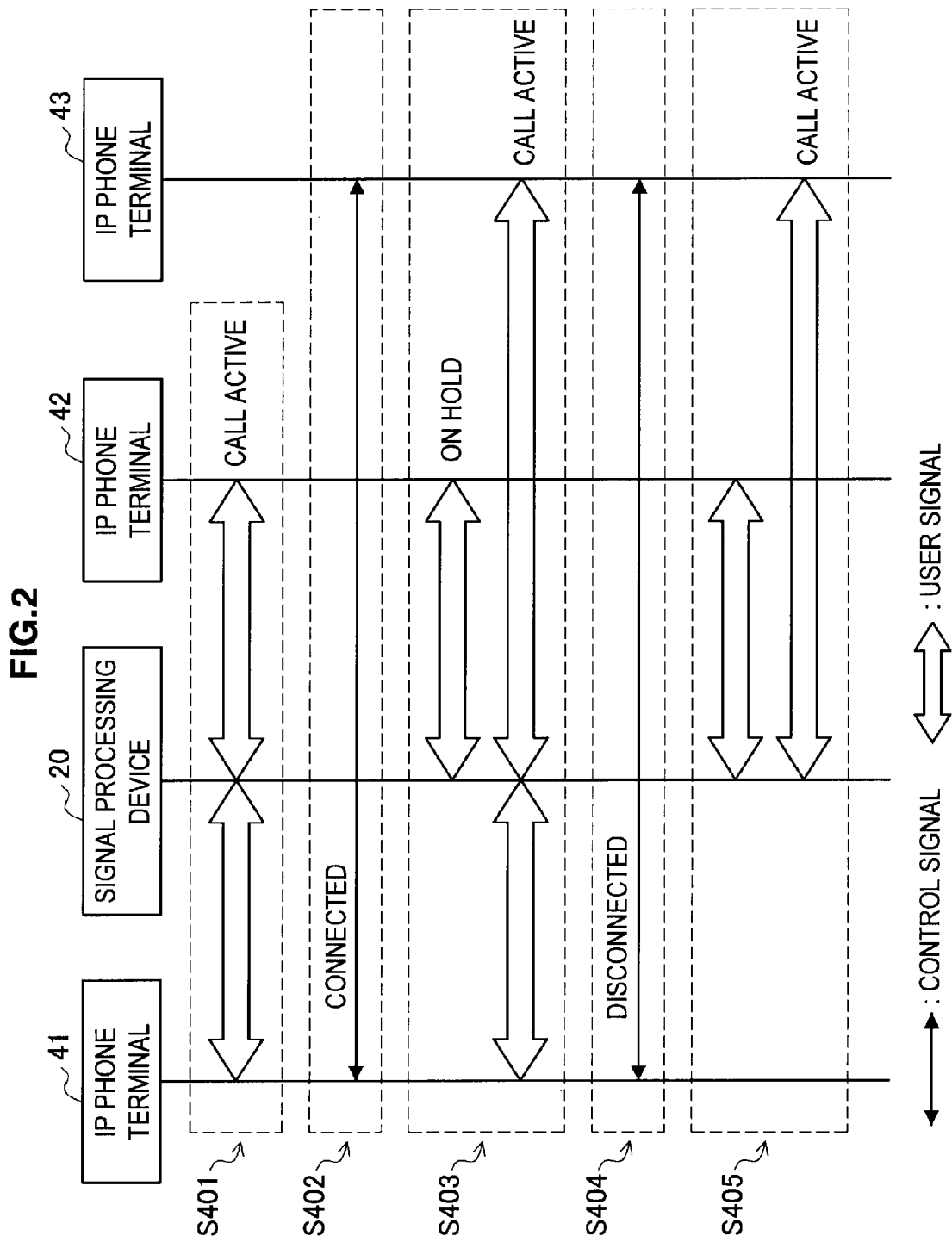
FIG. 2 is a sequence diagram illustrating an operation of the communication system according to the first embodiment.

FIG. 2 is a sequence diagram illustrating a data flow between the respective devices in the communication system 10 of FIG. 1. Here, the sequence diagram of FIG. 2 explains the operation of the user signals of the signal processing device 20 and control signals are simplified.

It is assumed that a call is active between the IP phone terminal 41 and the IP phone terminal 42 in an initial condition (S401). In this condition, the signal processing device 20 terminates user signals exchanged with the IP phone terminal 41 and user signals exchanged with the IP phone terminal 42, and transmits the user signals received from the IP phone terminal 41 to the IP phone terminal 42 and the user signals received from the IP phone terminal 42 to the IP phone terminal 41, respectively.

Then, it is assumed that the IP phone terminal 41 and the IP phone terminal 43 are connected based on a call control signal transmitted from the IP phone exchange server 30. In this case, the IP phone terminal 42 is put on hold and a call becomes active between the IP phone terminal 41 and the IP phone terminal 43 (S402). In this condition, the signal processing device 20 discards the user signal received from the IP phone terminal 42 and transmits a user signal that indicates an on-hold condition to the IP phone terminal 42. Further, the signal processing device 20 transmits a user signal received from the IP phone terminal 41 to the IP phone terminal 43 and a user signal received from the IP phone terminal 43 to the IP phone terminal 41 (S403).

Next, it is assumed that a control signal disconnects the call between the IP phone terminal 41 and the IP phone terminal 43 (S404). Thereby, the call between the IP phone terminal 42 and the IP phone terminal 43 becomes active.

The signal processing device 20 transmits the user signal received from the IP phone terminal 42 to the IP phone terminal 43 and the user signal received from the IP phone terminal 43 to the IP phone terminal 41, respectively (S405).

As described above, the signal processing device 20 realizes a call transfer by maintaining the user signals at an initial connection and without transmitting a control signal to the IP phone terminal 42.

Next, an operation to maintain a user signal of a session non-switchable terminal as illustrated in FIG. 2 will be described with an example in which RTP is used for the user signal.

In order to maintain the user signals, it is important to maintain a consecutiveness of RTP sequence numbers (SEQ), a consecutiveness of timestamps (TIME) and a consistency of synchronization source identifiers (SSRC) included in a RTP header of a RTP packet to be transmitted to the session non-switchable terminal, after a session non-switchable terminal initiates a call.

Figure 3:
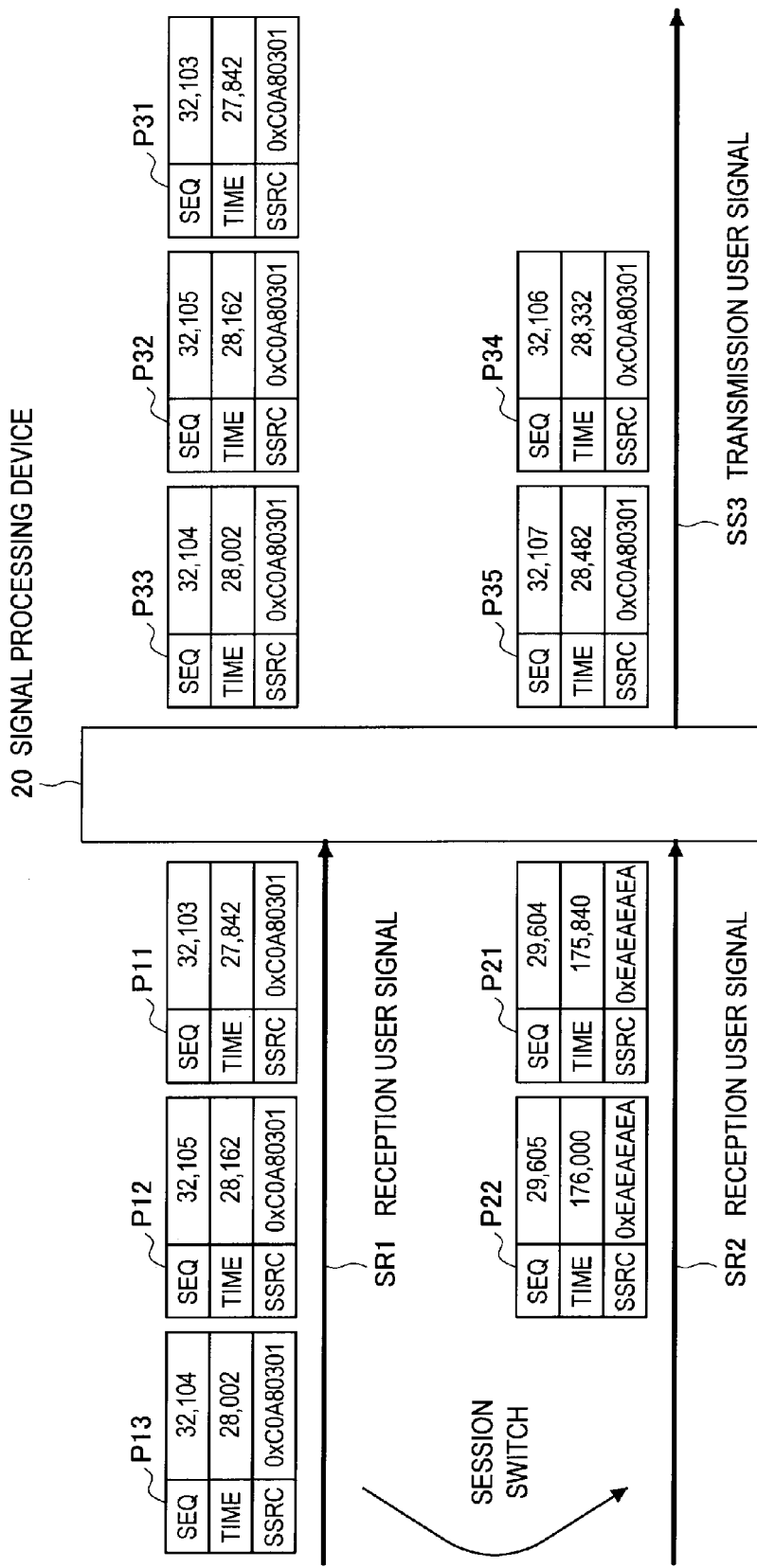
FIG. 3 is an explanatory diagram of a content example of a packet transmitted in the communication system according to the first embodiment.

FIG. 3 is an explanatory diagram of an operation example to maintain a user signal of the session non-switchable terminal.

In FIG. 3, a user signal sent from the IP phone terminal 41 to the signal processing device 20 is shown as a reception user signal SR1 and a user signal sent from the IP phone terminal 42 to the signal processing device 20 is shown as a reception user signal SR2. Further, in FIG. 3, a user signal sent from the signal processing device 20 to the IP phone terminal 43 is shown as a transmission user signal SS3.

As illustrated in FIG. 3, the reception user signal SR1 includes RTP packets P11 to P13 (generated in order of P11 to P13) and the reception user signal SR2 includes RTP packets P21, P22 (generated in order of P21, P22 after P11 to P13 are generated). Further, in FIG. 3, the transmission user signal SS3 includes RTP packets P31 to P35. The RTP packets P31 to P35 are packets that are converted from the RTP packet P11 to P13, P21 and P22, respectively. In FIG. 3, the RTP packet is simplified to show a content of original RTP packets. "SEQ" is a value of a RTP sequence number, "TIME" is a value of a timestamp and "SSRC" is a value of a synchronization source identifier.

As illustrated in FIG. 3, when the signal processing device 20 changes the reception user signal SR1 to the reception user signal SR2, the continuities of the RTP sequence number and timestamp are maintained in the transmission user signal SS3. Further, regarding the SSRC, when the signal processing device 20 changes the reception user signal SR1 to the reception user signal SR2, the value of the firstly-received reception user signal SR1 is maintained in the transmission user signal SS3. Here, the signal processing device 20 may determine that a session is switched when a reception user signal having a synchronization source identifier that is different from that of currently received RTP packet is received.

Next, an operation, in the signal processing device 20, for maintaining the consecutiveness of RTP sequence numbers will be explained.

Firstly, variables used in the explanation of the operation for maintaining the consecutiveness of the RTP sequence numbers will be described.

A reception reference sequence number (Rseq) is a sequence number of a RTP packet that is firstly received in every reception user signals.

A sequence number (SEQ) is a sequence number of a RTP packet received as a reception user signal.

When a RTP packet is received as a reception user signal, the signal processing device 20 acquires a sequence number (Nseq) of a RTP packet to be transmitted as a transmission user signal based on the following equation (1).

$$Nseq = SEQ - Rseq + Sseq \quad (1)$$

An initial value of a transmission reference sequence number (Sseq) is a sequence number of a firstly-received RTP packet of a first reception user signal and changed by adding "1" to Nseq when the reception user signal is changed.

When a RTP packet is received as a reception user signal, the Nseq is calculated and the sequence number of the RTP packet is changed and it is transmitted as a transmission user signal.

When the SEQ is smaller than the Rseq, the received packet is discarded without being transmitted as a transmission user signal since the sequence number may become the same number that was applied to a RTP packet before the reception user signal was changed.

With the above operation, even when the reception user signal is changed, in other words, when the session is switched, the signal processing device 20 can maintain the consecutiveness of the RTP sequence numbers of transmission user signals. Further, even when the RTP sequence numbers of the reception user signals are the same numbers (duplicate reception of RTP packets) or RTP packets are received in a different order, the RTP sequence numbers can be simply maintained and transmitted so that the influence to a user signal termination processing in the terminal can be reduced.

Next, an operation, in the signal processing device 20, for maintaining the consecutiveness of RTP timestamps will be explained.

Regarding RTP timestamps, since incremental values in the RTP packets may vary according to a parameter such as a codec of RTP and a sampling frequency, the signal processing device 20 acquires an incremental value based on reception user signals. Further, the signal processing device 20 maintains the consecutiveness of RTP timestamps in consideration of a packet loss when the reception user signal is changed.

Firstly, variables used in the following explanation of the operation for maintaining the consecutiveness of RTP timestamps will be described.

A reception reference timestamp value (RBt) is a timestamp of a firstly-received RTP packet of each reception user signal.

An initial value of a transmission reference timestamp value (SBt) is a timestamp of the firstly-received RTP packet of the first reception user signal and the value is updated when the reception user signal is changed.

A transmission maximum timestamp value (SMt) is a maximum value of timestamps applied to a RTP packet transmitted as a transmission user signals.

A reception final timestamp value (RLt) is a timestamp of a last-received RTP packet of the reception user signals.

Reception final time (RLc) is time when the last RTP packet of the reception user signal is received.

A timestamp (Pt) is a timestamp of a RTP packet received as a reception user signal.

Reception time (Pc) is reception time of a RTP packet received as a reception user signal.

A reception timestamp incremental value (Dt) is a timestamp incremental value of a reception user signal that is being received.

A reception packetizing interval (Dc) is a packet arrival interval (ms) of a reception user signal that is being received.

Figure 4:
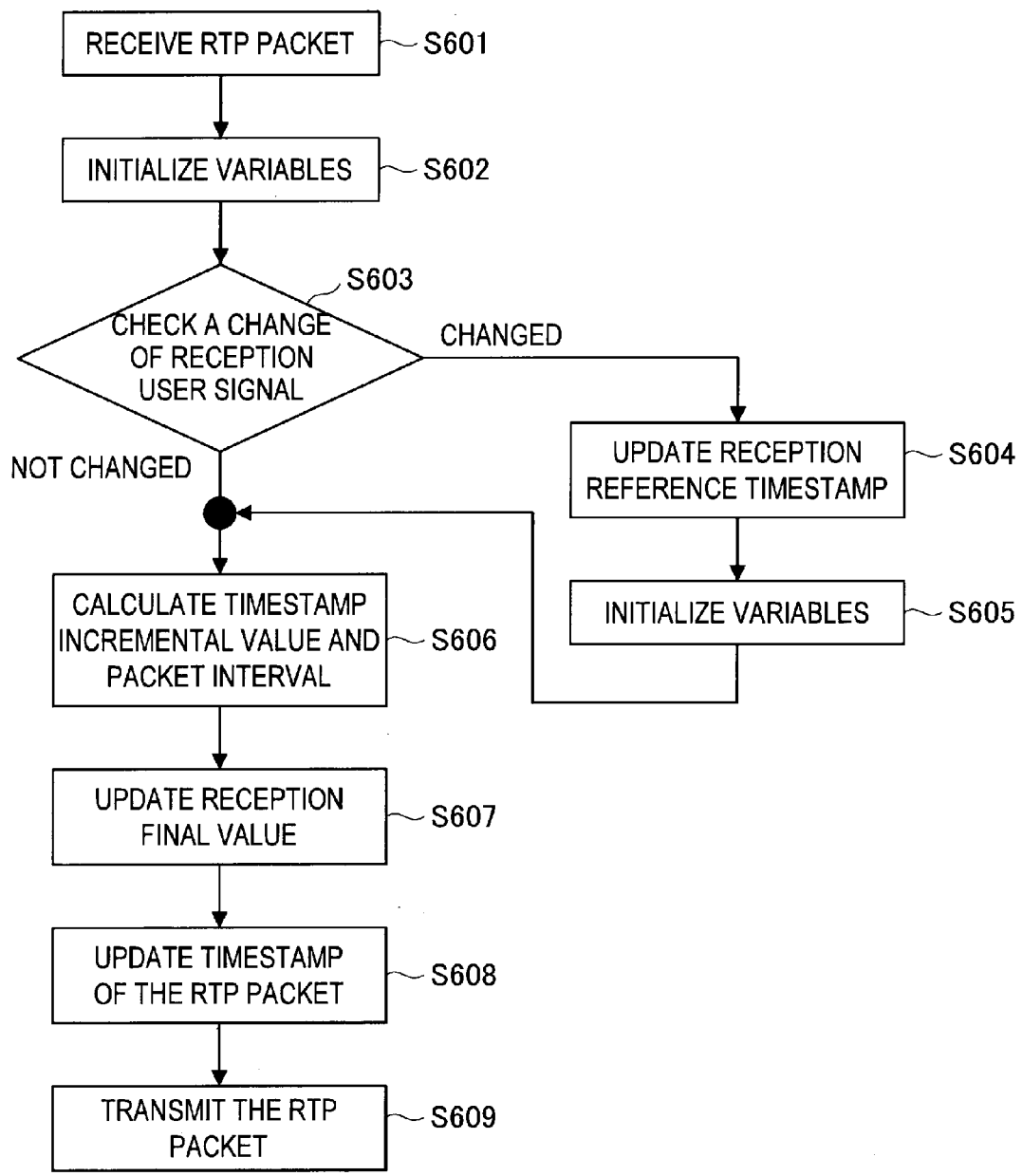
FIG. 4 is a flowchart illustrating an operation of a signal processing device according to the first embodiment.

FIG. 4 is a flowchart of the operation, in the signal processing device 20, for maintaining the consecutiveness of RTP timestamps.

Using this flowchart and the above variables, the operation, in the signal processing device 20, for maintaining the consecutiveness of RTP timestamps will be explained.

Firstly, it is assumed that the signal processing device 20 receives a RTP packet as a reception user signal (S601).

When the received RTP packet is a firstly-received RTP packet of a first reception user signal, the variables are initialized. The initialization is executed as RBt=Pt, RLt=Pt, and RLc=Pc (S602).

Next, according to the content of the received RTP packet, the signal processing device 20 checks whether or not the reception user signals have been changed (S603). When it is determined that the signals are not changed, the operation starts from later described step S606 and, when it is determined that the signals are changed, the operation starts from later described step S604.

In the checking of whether or not the reception user signals have been changed in step S603, for example, when the received RTP packet has a synchronization source identifier that is different from those of the ever received RTP packets, it is determined that the reception user signal is changed and, when the received RTP packet has the same synchronization source identifier, it is determined that the signal is not changed.

Further, the checking of whether or not the reception user signals have been changed, that is, a checking of the timing of a session change in step S603, may be executed by analyzing the content of call control signals of SIP transmitted between the IP phone exchange server 30 and the IP phone terminals.

Then, in step S603, when it is determined that there is a change of the reception user signals, a reception reference timestamp value (SBt) is updated based on a calculation of the following equation (2) (S604).

$$SBt = SMt + Dt \times (Pc - RLc)/Dc \quad (2)$$

Next, upon receiving the changed reception user signal, the variables are initialized (S605). The initialization in step S605 is executed as: SMt=SBt, RBt=Pt, RLt=Pt, RLc=Pc, Dt=0, and Dc=0.

Next, the timestamp incremental value (Dt) and the packetizing interval (Dc) are updated (S606). In the update in step S606, when the following equation (3) is satisfied, the following equation (4) is used and, when the following equation (5) is satisfied, the following equation (6) is used.

$$(Pt - RLt) > Dt \quad (3)$$

$$Dt = Pt - RLt \quad (4)$$

$$(Pc - RLc) > Dc \quad (5)$$

$$Dc = Pc - RLc \quad (6)$$

Next, the reception final value is updated (S607). The update in step S607 is executed as: RLt=Pt and RLc=Pc.

Then, the timestamp of the RTP packet is updated (S608). The update in step S5608 is executed by using the following equation (7).

$$Pt = SBt + (Pt - RBt) \quad (7)$$

Next, the RTP packet including the updated timestamps is transmitted as a transmission user signal (S609).

With the above operation, even when reception user signals are changed, the consecutiveness of the RTP timestamps of the transmission user signals can be maintained.

Next, the operation, in the signal processing device 20, for maintaining the consistency of the RTP synchronization source identifier will be explained.

In the operation for maintaining the identification of the RTP synchronization source identifier, a start synchronization source identifier (Sssrc) is used as a variable.

The start synchronization source identifier (Sssrc) is a synchronization source identifier of the firstly received RTP packet of the first reception user signal. When the RTP packet is received as a reception user signal, the synchronization source identifier of the RTP packet is changed to Ssrc and transmitted as a transmission user signal.

As described above, with the process by the signal processing device 20, even when the reception user signals are changed, the consistency of the RTP synchronization source identifiers of the transmission user signals can be maintained.

(A-3) Effects of First Embodiment

According to the first embodiment, the following effects can be achieved.

The signal processing device 20 can realize a switching of communication sessions during a call, such as a call transfer service or a connection to a guidance, between communication devices having different specifications related to communication sessions, that is, between an IP phone terminal with a session switching function and an IP phone terminal without a session switching function.

(B) Second Embodiment

Hereinafter, a signal processing device, a signal processing device program and a communication system according to a second embodiment of the present invention will be described with reference to the drawings.

(B-1) Configuration of Second Embodiment

Figure 5:
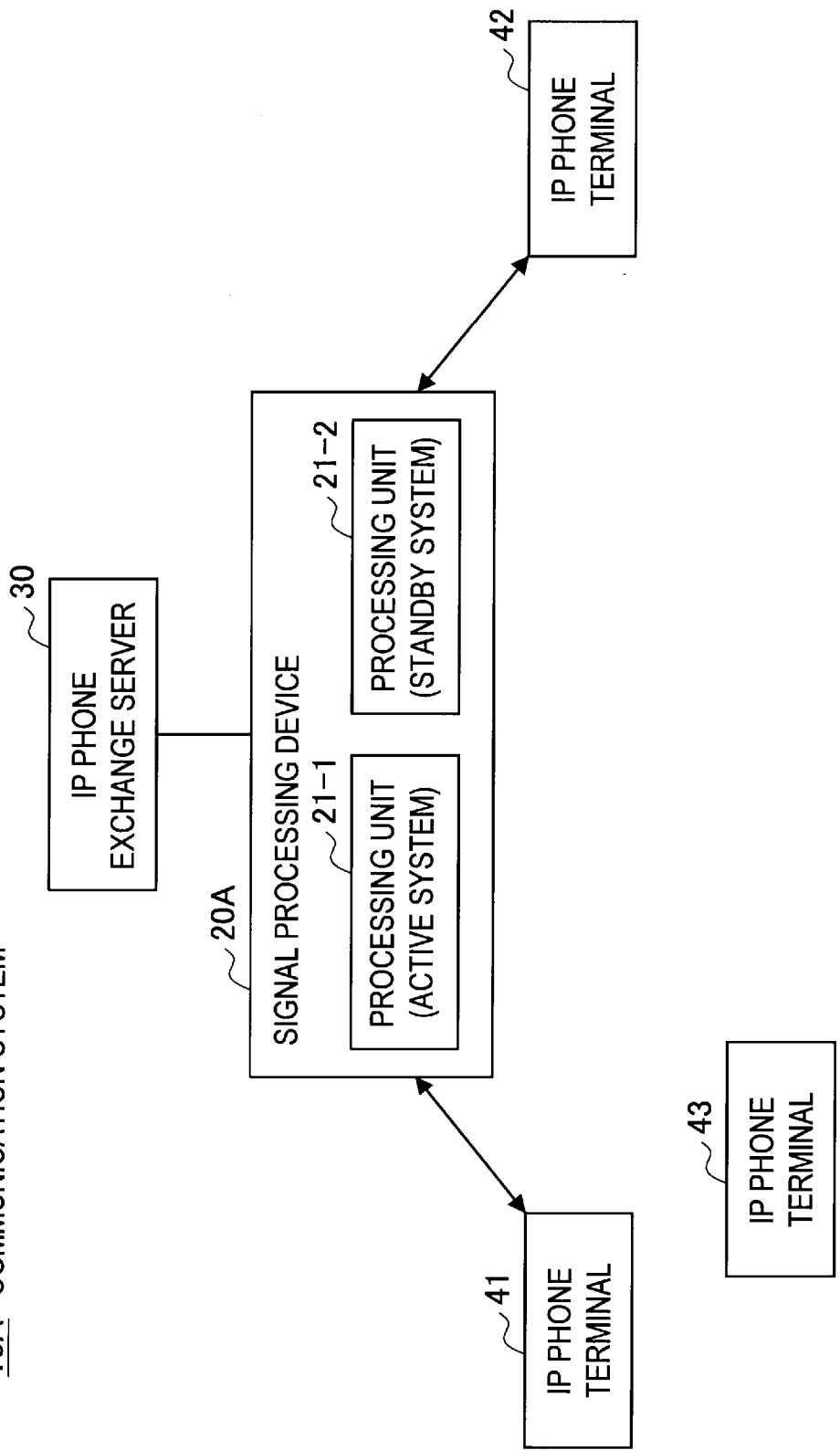
FIG. 5 is a block diagram illustrating an entire configuration of a communication system according to a second embodiment.
Figure 6:
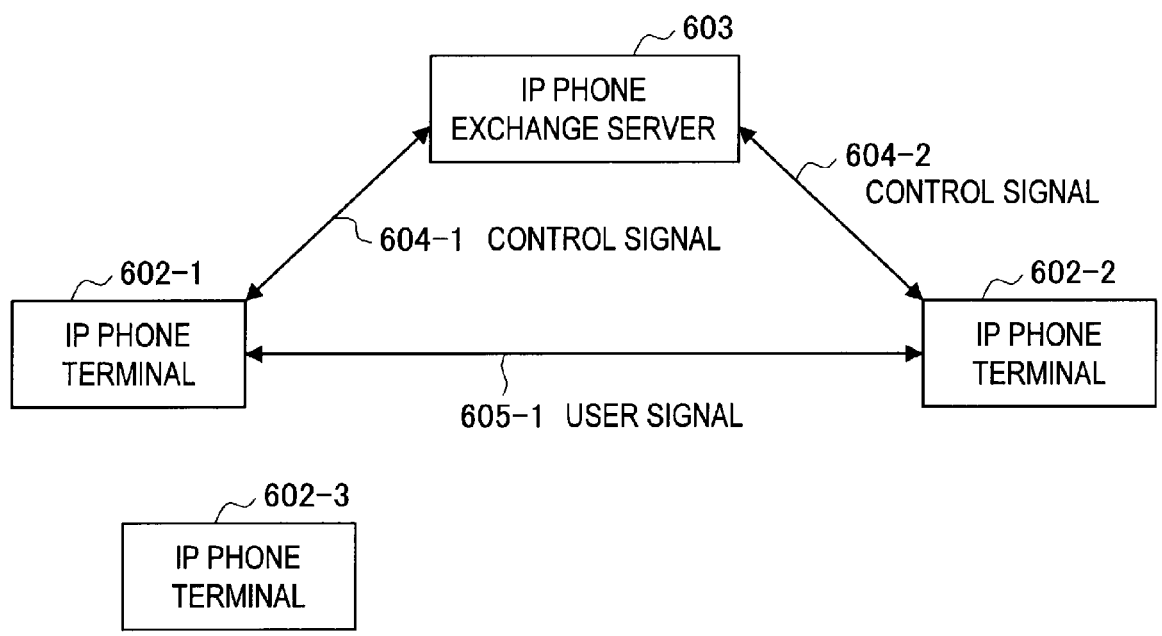
FIG. 6 is a block diagram illustrating an example of a configuration of a related IP phone communication system.
Figure 7:
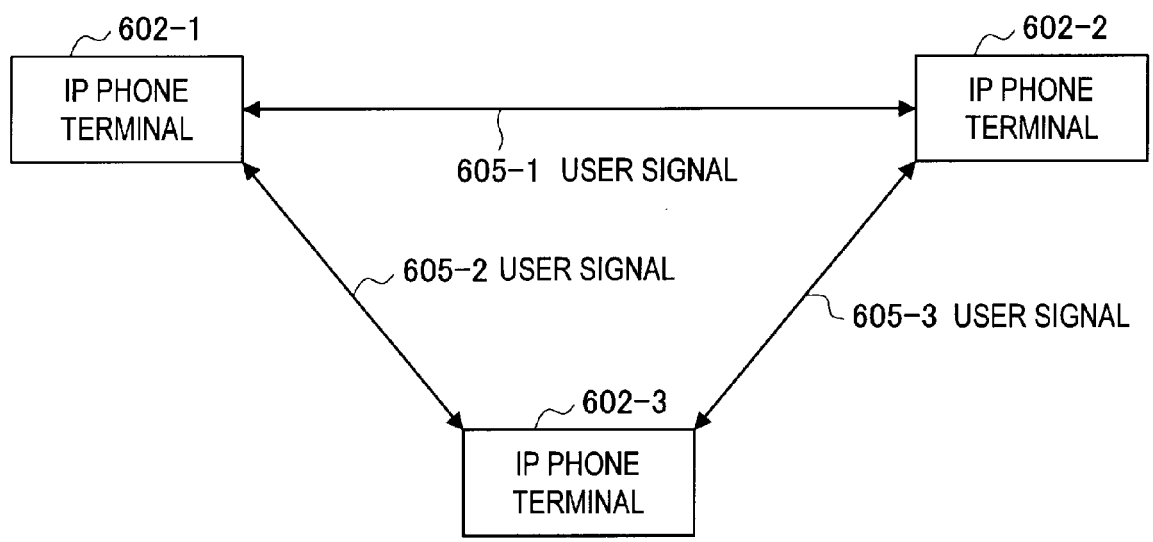
FIG. 7 is an explanatory diagram of an example of an operation of the related IP phone communication system.

FIG. 5 is a block diagram illustrating an entire configuration of a communication system 10A of this embodiment.

In FIG. 5, in the communication system 10A, a signal processing device 20A, an IP phone exchange server 30, and three IP phone terminals 41, 42, 43 are provided. Since the IP phone exchange server 30 and IP phone terminals 41, 42, 43 are the same as those in the first embodiment, detailed description thereof will be omitted.

The signal processing device 20A of the second embodiment is made by switching the signal processing device 20 of the first embodiment to be a device having a redundant configuration and includes a processing unit 21-1 and a processing unit 21-2. The processing units 21-1, 21-2 are capable of similar processing to the signal processing device 20 of the first embodiment and, in FIG. 5, the processing unit 21-1 is configured to be an active system and the processing unit 21-2 is configured to be a standby system so as to form an active-standby configuration.

In FIG. 5, in the signal processing device 20A, the processing unit serving as the standby system is only the processing unit 21-2; however, plural processing units serving as the standby system may be provided.

A condition (trigger) for switching from the processing unit 21-1 serving as the active system to the processing unit 21-2 serving as the standby system or a method for switching is not limited to detailed content; however, for example, a monitor processing unit (or an external monitor device) (not shown) may monitor an operation of the processing unit 21-1 serving as the active system and switching to the processing unit 21-2 may occur when an error is detected. In the process for switching from the processing unit 21-1 serving as the active system to the processing unit 21-2 serving as the standby system, switch processing means of a known server device or the like may be used.

Further, to maintain the consecutiveness of packets transmitted among the IP phone terminals 41 to 43, information related to communication sessions is transferred from the processing unit 21-1 to the processing unit 21-2. Then, in the processing unit 21-2, when a switch from the standby system to the active system is executed, based on the information given from the processing unit 21-1, the consecutiveness related to packets transmitted among the IP phone terminals 41 to 43 is maintained.

The information transmitted from the processing unit 21-1 to the processing unit 21-2 will be described in detail in the following explanation of the operation.

(B-2) Operation of Second Embodiment

Next, an operation of the communication system 10A of the second embodiment having the above configuration will be explained.

An additional operation in a case where the termination processing of the user signal described in the first embodiment is operated in the redundant configuration will be explained. Other operations are the same as the first embodiment.

Firstly, an operation in a normal processing of the communication system 10A will be explained.

The active system executes the same operation described in the first embodiment and periodically transfers, as synchronous data, the following variables related to the RTP sequence number, RTP timestamp and RTP synchronization source identifier maintained in the active system to the standby system. The transferred data is stored in the standby system.

RTP sequence number: transmission reference sequence number (Sseq)

RTP timestamp: transmission maximum timestamp value (SMt), reception final time (RLc), reception timestamp incremental value (Dt), reception packetizing interval (Dc)

RTP synchronization source identifier: start synchronization source identifier (Sssrc)

The standby system updates the variables in the standby system based on the synchronous data received from the active system.

Next, an operation for switching from the processing unit 21-1 to the processing unit 21-2 will be explained.

Upon receiving synchronous data from the standby system, the active system may switch the operation to be executed by the standby system or, when an error or the like occurs in the active system, the active system may be stopped without switching to the standby system.

Upon receiving a control signal and a user signal for switching to the active system from a monitor processing unit (or an external monitor device) (not shown), the standby system switches the operation to be executed by the active system. Then, the standby system starts the operation as follows when switching.

The operation for maintaining the consecutiveness of the RTP sequence number starts using stored Sseq.

The operation for maintaining the consecutiveness of the RTP timestamps starts from the above described operation for maintaining the consecutiveness of RTP timestamps of FIG. 4 using stored SMt, RLc, Dt and Dc.

The operation for maintaining the consistency of the RTP synchronization source identifiers stars using stored Sssrc.

(B-3) Effects of Second Embodiment

According to the second embodiment, the following effects can be achieved.

In the IP phone signal processing device 20A, since the processing units are made in a redundant configuration in the signal processing device 20A, a system that is more reliable than the system of the first embodiment can be provided.

(C) Other Embodiments

The present invention is not limited to the above embodiments and includes the following modified embodiments.

(C-1) In the above embodiments, the devices to be processed by the signal processing device are IP phone terminals; however, the present invention is not limited to this configuration and other communication devices, such as an IP-PBX, that cover terminals may be employed.

(C-2) In the above embodiments, the signal processing device processes RTP packets and the like; however, the signal processing device may also process the RTCP packets.

(C-3) In the above embodiments, the signal processing device processes RTP packets and the like; however, the protocols to be used are not limited to this and packets related to other real-time communications may be employed. In such a case, the variables used in the explanation of operations of the signal processing device 20 may be replaced by corresponding variables in those protocols so that the same effects as the above embodiments can be achieved.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-225144 filed in the Japan Patent Office on Sep. 29, 2009, the entire content of which is hereby incorporated by reference.

What is claimed is:

1. A signal processing device comprising:
   a packet receiving means for receiving packets from IP communication terminals; and
   a signal processing means for transmitting information carried by packets received by the packet receiving means to other IP communication terminals,
   wherein the signal processing means comprises:
      means for establishing a communication session between a first one of the IP communication terminals and a second one of the IP communication terminals during a first time interval, and
      means for permitting the session to be shifted so as to have a connection between the first one of the IP communication terminals and a third one of the IP communication terminals during a second time interval that begins following an end of the first time interval, and
   wherein the means for permitting includes packet converting means for converting packets received by the packet receiving means from the third one of the IP communication terminals during the second time interval so as to maintain a consecutiveness of RTP sequence numbers and time stamps with packets received by the packet receiving means from the first one of the IP communication terminals during the first time interval and so as to maintain consistency of synchronization source identifiers included in RTP headers of RTP packets to be transmitted to the first one of the IP communication terminals during the first and second time intervals, the packet converting means determining sequence numbers Nseq of packets to be transmitted to the first one of the IP communication terminals during the second time interval in accordance with the equation Nseq=SEQ−Rseq+Sseq, where SEQ represents sequence numbers of packets received by the signal processing means from the third one of the IP communication terminals during the second time interval, Rseq represents the sequence number of the first packet received by the signal processing means from the third one of the IP terminals during the second time period, and Sseq represents the sum of a predetermined number plus the sequence number of the last packet received by the signal processing means from the second one of the IP communication terminals during the first time period.

2. The signal processing device according to claim 1, wherein the first one of the IP communication terminals is a session non-switchable communication device.

3. The signal processing device according to claim 1, wherein the packet receiving means and the signal processing means are included in a first processing unit, and further comprising:
  a second processing unit that includes a packet receiving means and a signal processing means as in the first processing unit;
  means for detecting an error of the first processing unit;
  a switching means for keeping the first processing unit as an active system in normal operation and switching from the first processing unit to the second processing unit which is a standby system if an error of the first processing unit is detected; and
  a communication session information storing means for storing, for the second processing unit, communication session information related to a communication session that is being processed in the first processing unit in normal operation,
  wherein, when activated to operate as the active system by switching from the first processing unit, the second processing unit consistently processes, using the communication session information, the packets related to the communication session which has been being processed in the first processing unit.

4. A non-transitory computer-readable medium that stores a signal processing program which, when executed by a computer, controls the computer to operate as a signal processing device that comprises:
  a packet receiving means for receiving packets from IP communication terminals; and
  a signal processing means for transmitting information carried by packets received by the packet receiving means to other IP communication terminals,
  wherein the signal processing means comprises:
    means for establishing a communication session between a first one of the IP communication terminals and a second one of the IP communication terminals during a first time interval, and
    means for permitting the session to be shifted so as to have a connection between the first one of the IP communication terminals and a third one of the IP communication terminals during a second time interval that begins following an end of the first time interval, and
  wherein the means for permitting includes packet converting means for converting packets received by the packet receiving means from the third one of the IP communication terminals during the second time interval so as to maintain a consecutiveness of RTP sequence numbers and time stamps with packets received by the packet receiving means from the first one of the IP communication terminals during the first time interval and so as to maintain consistency of synchronization source identifiers included in RTP headers of RTP packets to be transmitted to the first one of the IP communication terminals during the first and second time intervals, the packet converting means determining sequence numbers Nseq of packets to be transmitted to the first one of the IP communication terminals during the second time interval in accordance with the equation Nseq=SEQ−Rseq+Sseq, where SEQ represents sequence numbers of packets received by the signal processing means from the third one of the IP communication terminals during the second time interval, Rseq represents the sequence number of the first packet received by the signal processing means from the third one of the IP terminals during the second time period, and Sseq represents the sum of a predetermined number plus the sequence number of the last packet received by the signal processing means from the second one of the IP communication terminals during the first time period.

5. A communication system that includes a plurality of the IP communication devices and a signal processing device for processing packets transmitted among the plurality of the IP communication devices, wherein the signal processing device is configured according to claim 1.

6. The signal processing device according to claim 1, wherein the IP communication terminals are IP phone terminals.

7. The signal processing device according to claim 1, wherein the signal processing means further comprises means for permitting the session to be shifted so as to have a connection between the second one of the IP communication terminals and the third one of the IP communication terminals during a third time interval subsequent to the second time interval.

8. The signal processing device according to claim 1, wherein the predetermined number is 1.

9. The signal processing device according to claim 1, wherein the packet converting means discards any pixels received from the third one of the IP terminals during the second time period if their sequence number is smaller than Rseq.

* * * * *